J. W. DREW.
LUBRICATING DEVICE FOR PUMP PISTONS.
APPLICATION FILED FEB. 28, 1921.

1,390,680.

Patented Sept. 13, 1921.

INVENTOR
JOHN W. DREW
By F. R. Cornwall Atty.

UNITED STATES PATENT OFFICE.

JOHN W. DREW, OF ST. LOUIS, MISSOURI, ASSIGNOR TO MOON BROTHERS MANUFACTURING COMPANY, OF ST. LOUIS, MISSOURI, A CORPORATION OF MISSOURI.

LUBRICATING DEVICE FOR PUMP-PISTONS.

1,390,680.   Specification of Letters Patent.   Patented Sept. 13, 1921.

Application filed February 28, 1921. Serial No. 448,564.

*To all whom it may concern:*

Be it known that I, JOHN W. DREW, a citizen of the United States, residing at St. Louis, Missouri, have invented a certain new and useful Improvement in Lubricating Devices for Pump-Pistons, of which the following is a full, clear, and exact description, such as will enable others skilled in the art to which it appertains to make and use the same, reference being had to the accompanying drawings, forming part of this specification, in which—

Figure 1:
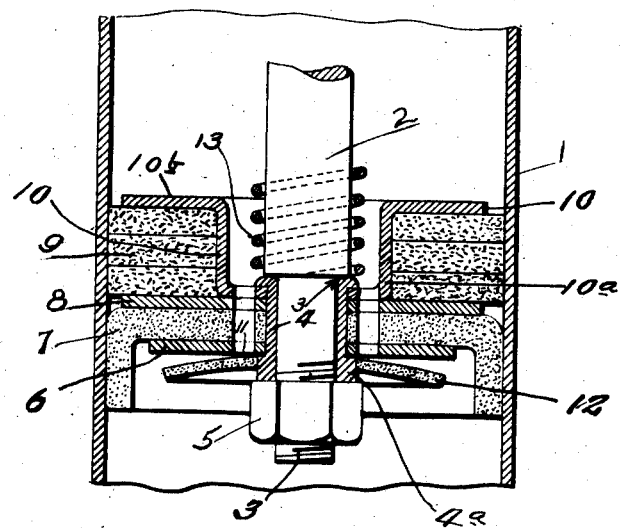
Figure 1 is a vertical sectional view through a portion of a pump cylinder showing my improved piston positioned therein.
Figure 2:
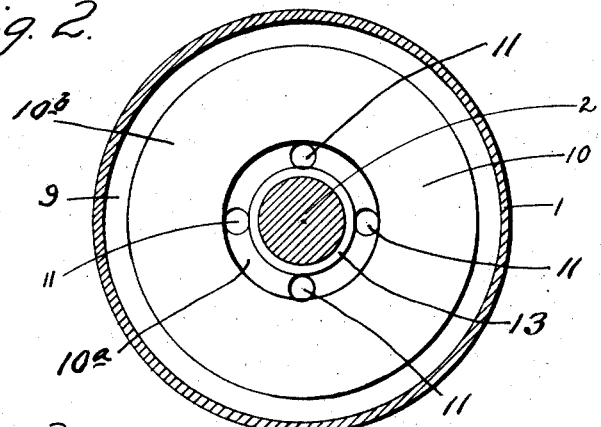
Fig. 2 is a plan view of the piston.
Figure 3:
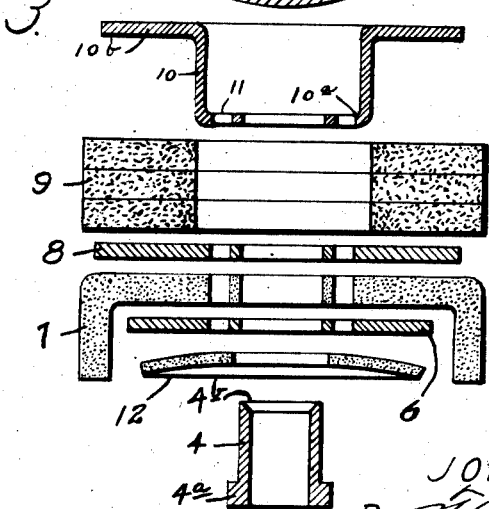
Fig. 3 is a sectional view of the piston head with the parts separated.

This invention relates to new and useful improvements in pistons for air pumps, being designed particularly for air pumps of the type employed for the inflation of bicycle and automobile tires and which are usually operated by hand.

The object of this invention is to make a pump of this type more efficient by providing a simple and effective lubricating means for the piston, and which can be cheaply manufactured and add but few extra parts to the structure.

In the drawings, 1 indicates the cylinder of the pump, 2 the piston rod which is reduced near its lower end to form a shoulder 3. 4 is a sleeve designed to fit the reduced portion of piston rod 2, said sleeve being held in position by a nut 5. In the lower end of sleeve 4 is an enlarged annular ring 4ª upon which rests a metallic retaining washer 6, which in turn acts as a support for a cup-shaped member 7 made of fibrous material, and a second and slightly larger guiding washer 8 rests on top of the fibrous cup-shaped member 7. 9 is one or more washers made of some fibrous material, preferably felt, these washers having a diameter corresponding to the inner diameter of the cylinder 1. Fibrous washers 9 rest on metallic washers 8 and are held in place by a cup-shaped metallic member 10 which has an inwardly disposed flange 10ª which bears against sleeve 4 and an outwardly disposed flange 10ᵇ which holds the fibrous washers compactly in position.

The upper end of sleeve 4 is beveled so that it may be knurled or spun over the flange 10ª, thus making a unit of the group supported by said sleeve, *i. e.*, the retaining washer 6, the leather cup 7, the guiding washer 8, the felt washers 9, and the cup-shaped member 10. A series of holes 11 are made through this unit, said holes being approximately parallel to the axis of the piston rod 2.

A washer 12 of leather or similar material which acts as a valve is placed on the annular ring 4ª of sleeve 4. This valve member is permitted to move freely on the annular ring of the sleeve and is prevented from coming off by nut 5, which clamps the sleeve and its carried parts in position on the rod.

The fibrous washers 9 are soaked with a lubricant so that when the piston moves in pumping the air, small particles of the lubricant are continually being left along the wall of the cylinder. These particles of lubricant that adhere to the cylinder make the friction of the piston less and help make the pump more efficient by sealing or partially sealing the leather cup against the cylinder. Advantage is taken of capillary attraction. Since the lubricant is an attracted liquid, it will be distributed throughout the fibrous washers at all times, thus insuring long lubricating qualities to the washers.

In the suction stroke, the air passes through the openings 11, strikes against the valve 12 and since valve 12 is movably arranged on annular ring 4ª, it will permit the free passage of air into the chamber beneath the piston. In the compression stroke of the piston, the air below the piston reseats the valve 12 so that the openings 11 are effectively closed. During both suction and compression strokes of the piston, particles of the lubricant from the fibrous washers 9 are continually being deposited on the wall of the cylinder by capillary attraction.

A spring 13 may be placed on the piston rod 2 in order to absorb the shock that might occur at the extreme end of the suction stroke if the piston was suddenly drawn up against the cylinder head by such movement.

I claim:

1. In a piston, the combination of a piston rod, a leather cup-shaped washer fixed thereon, metallic washers arranged above and below said leather cup-shaped washer, uninterrupted air holes through said members, a leather valve member arranged to control one end of said air holes, a fibrous lubricating washer juxtaposed against one of said metallic washers and provided with a central opening of larger diameter than said registering air holes, and a cup-shaped metallic washer fixed to said piston rod for holding said fibrous washer in fixed position, said cup-shaped washer being also provided with registering air holes.

2. In a piston, the combination of a piston rod having a reduced end portion forming a shoulder, a sleeve member mounted on the reduced portion of said piston rod and having an annular enlargement on one end thereof, a retaining washer seated against said enlargement, a leather cup-shaped member, a guiding washer, a lubricating washer, and a cup-shaped metallic washer for holding said lubricating washer compactly in position, all of said parts being permanently mounted on said sleeve and having a series of registering openings parallel to the axis of said piston rod, a flexible valve slidingly mounted on the enlargement of said sleeve for closing said openings, and a nut for clamping said sleeve and its carried parts in position against said shoulder and for holding said valve in position.

In testimony whereof I hereunto affix my signature this 25th day of February, 1921.

JOHN W. DREW.